United States Patent [19]

Rivera et al.

[11] Patent Number: 5,040,324

[45] Date of Patent: Aug. 20, 1991

[54] CARRIER FOR FISHING RODS AND REELS

[76] Inventors: Ron. L. Rivera, 1204 Whitefence La., Addison, Ill. 60101; Glenn L. Rivera, 203 Regency Dr., Apt. 623, Bloomingdale, Ill. 60108; Eugene P. Rivera, 1217 Anvil Ct., Addison, Ill. 60101

[21] Appl. No.: 509,726

[22] Filed: Apr. 16, 1990

[51] Int. Cl.$^5$ ................................................ A01K 97/08
[52] U.S. Cl. ...................................... 43/26; 224/913; 224/922
[58] Field of Search ................ 43/26; 206/3, 5, 11; 224/913, 922

[56] References Cited

U.S. PATENT DOCUMENTS

| | | | |
|---|---|---|---|
| 2,298,694 | 10/1942 | Harship | 224/922 |
| 3,035,746 | 5/1962 | Hayes | 224/913 |
| 3,282,482 | 11/1966 | Scharsu | 224/922 |
| 3,334,794 | 6/1967 | Saari | 274/913 |
| 3,575,327 | 4/1971 | Harrison . | |
| 3,674,190 | 7/1972 | Wright . | |
| 3,972,144 | 8/1976 | Geisler . | |
| 4,136,478 | 1/1979 | Wycosky . | |
| 4,463,885 | 8/1984 | Ball | 224/913 |
| 4,529,112 | 7/1985 | Miller | 224/913 |
| 4,726,141 | 2/1988 | McBride et al. . | |
| 4,759,963 | 7/1988 | Uso | 224/922 |

*Primary Examiner*—Kurt Rowan
*Attorney, Agent, or Firm*—James N. Videbeck

[57] ABSTRACT

An improved carrier strap assembly for carrying a plurality of fishing rods and reels includes a first elongate strap or spine member having opposed adjustable size loops at each end thereof. A second strap means is mounted perpendicularly to said first strap means and slidably therealong the one of the opposed end loops. A third strap means is mounted slidably along the first strap means between the two end loops. Both the second and third strap means are fitted with hook and loop fasteners provided for selectably releasable engagement of one side of the strap means to the other side thereof. In the operation, the bottom loop on the first strap is enlarged until it fits around the fishing rod handles under the reels and then is cinched up until snug. At the opposite end of the first strap, the top loop on the first strap is adjusted in size until the second strap is positioned to extend around the upper end of the fishing poles under the first full eyelet on the rod. The second strap means is engaged around the fishing poles and around itself until the hoop and loop fasteners retain same in a desired loose or snug position. The third strap means is moved along the spine of the first strap means and fitted around the fishing rods and around itself until securly engaged to allow the portion of the first strap means between the third strap means and the bottom loop to be utilized as a carrying handle or shoulder strap for carrying the fishing rods and reels.

7 Claims, 2 Drawing Sheets

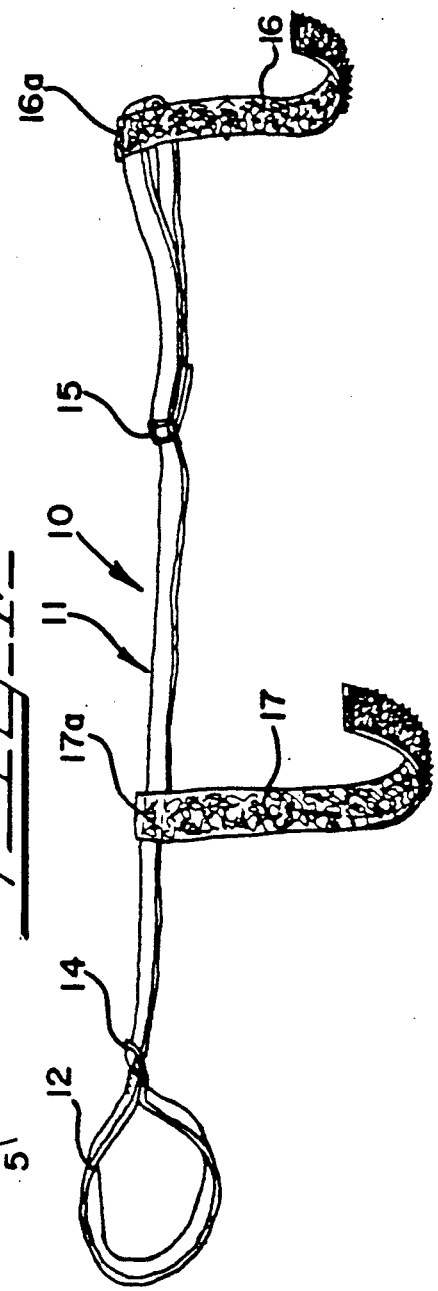
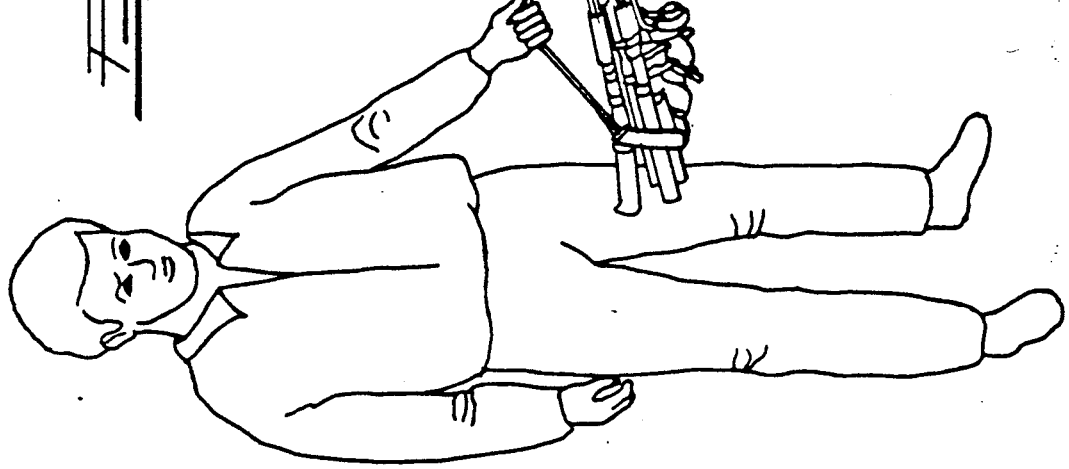

CARRIER FOR FISHING RODS AND REELS

BACKGROUND OF THE INVENTION

This invention relates generally to carriers for fishing equipment, namely fishing rods and reels and, more particularly, to an adjustable, multiple strap assembly for carrying a plurality of fishing rods and reels.

Heretofore, carriers for fishing rods and reels have been of a type that enclosed the entire rod and reel in a fabric such as shown in U.S. Pat. Nos. 3,575,327 and 3,972,144, or cover the reel and rod handle of a plurality of fishing rod assemblies, such as shown in U.S. Pat No. 3,674,190, or provide individual pouches to surround the rod handle and reel for one or more fishing rods as shown in U.S. Pat. Nos. 4,136,748 and 4,726,141.

The fabric or man-made sheet material used in these rod and reel covers is bulky and tends to collect dirt and/or undesirable foreign matter which may accumulate near water, boats, etc. and find its way into the interior of the fabric, or carrier pouches, covers and the like.

A need has developed for a simplified fishing equipment carrier capable of maintaining a plurality of assembled or partly assembled fishing rods and reels in ordered orientation without the need for a large flexible sheet-type structure which may accumulate water, dirt, grime, etc. while performing its intended function. Further, the provision of large sheet type fabric structures in fishing rod and reel carriers requires that each carrier have a minimum of fabric material which may not always be needed if the number of fishing rods and reels carried is less than the maximum number supportable by the carrier structure.

Therefore, it is an object of the present invention to provide a new and improved carrier for efficiently transporting a plurality of assembled fishing rod and reel assemblies.

Another object of the present invention is the provision of a carrier for assembled fishing rods and reels which adjustably provide for efficient carrying of differing number of assembled fishing rods and reels.

SUMMARY OF THE INVENTION

The invention disclosed is carrier for fishing rods including handles and reels. The invention includes a first elongate strap means having a loop means at each of the opposing ends of the elongate strap means. The loop means are adjustable for providing first and second adjustable sized loops adjacent the opposed ends of the strap means. A second elongate strap is looped at one end thereof for mounting around and slidably along the first elongate strip between the first and second adjustable sized loops. The second elongate strap has fastener means positioned along its length. A third elongate strap includes a fourth loop adjacent one of its ends for mounting around and slidable along the first elongate strap at one of the first and second adjustable sized loops. The third elongate strap also includes means along its length.

BRIEF DESCRIPTION OF THE DRAWINGS

Features of the present invention which are believed to be novel are set forth with particularity in the appended claims. The invention, together with further objects and advantages thereof, may best be understood by reference to the following detailed description taken in conjunction with the accompanying sheets of drawings, in the several figures of which like reference numerals identify like elements, and in which:

FIG. 3 is a perspective view of the carrier of the present invention mounted on a plurality of assembled fishing rods and reels in hand strap mode when being carried by a user;

FIG. 4 is a front perspective view of the carrier of the present invention as it appears in unfolded open condition; and FIG. 5 is a cross-sectional view taken substantially along line 5—5 of FIG. 3.

DETAILED DESCRIPTION OF THE PREFERRED EMBODIMENT

Figure 1:
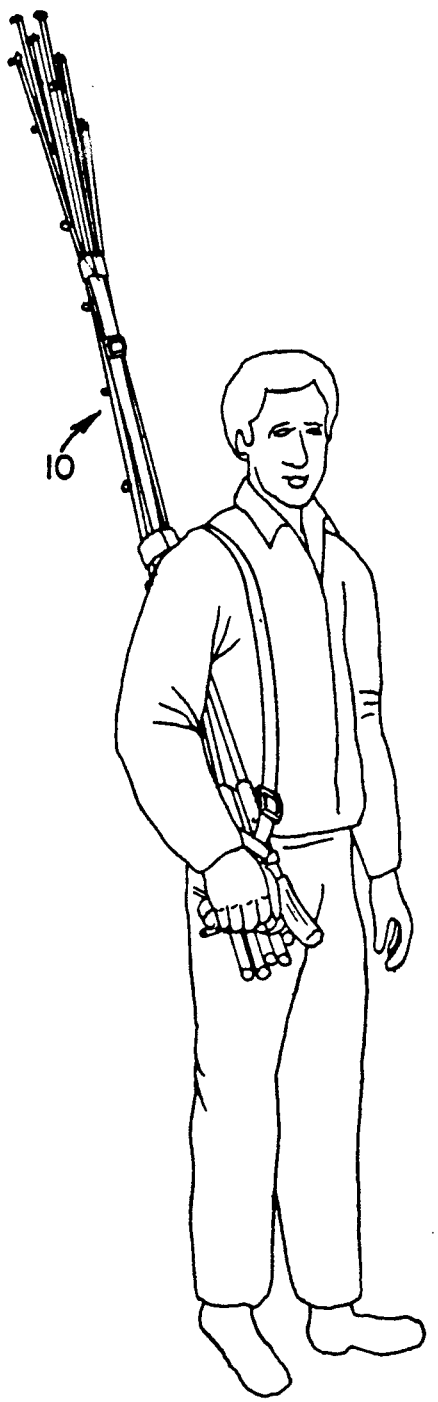
FIG. 1 is a perspective view of the carrier for assembled fishing rods and reels constructed in accordance with present invention, shown in shoulder strap carrying mode on a user.

Referring to FIGS. 1 through 5, and most particularly to FIG. 4, a fishing rod and reel carrier, constructed in accordance with the present invention, generally indicated at 10, includes a main or first strap 11 having a pair of loops 12-13 at the opposing ends thereof. First loop 12 and second loop 13 are made adjustable in size through the use of buckles 14-15, or the like. In addition to the main strap 11, a second strap member 16 is elongate and includes one looped end, third loop 16a, which is adapted to be slidably mounted along second loop 13 of main strap 11. Strap 16 includes hook and loop fastener material, 16b-16c respectively, positioned on the opposing sides thereof. Such material is commonly sold under the trademark VELCRO.

A third strap member 17 is elongated includes one looped end, fourth loop 17a, which is adapted for fitting around and being slidable along the central portion of the main strap 11 between the buckles 14-15 defining the inside ends of first and second loops 12-13. Third strap 17 also includes hook and loop fastener means, 17b-17c respectively, positioned upon opposing sides of the strap.

The end of the bottom first loop 12 fitting into a buckle 14 is fitted in typical fashion around a central post (not shown) in the buckle similarly to the mounting of buckle 15. However, the distal portion of the strap 11 immediately inwardly adjacent buckle 14 is folded at right angles and sewn over the fold to extend outwardly from the end of buckle 14, as shown most clearly in FIG. 2.

Figure 2:
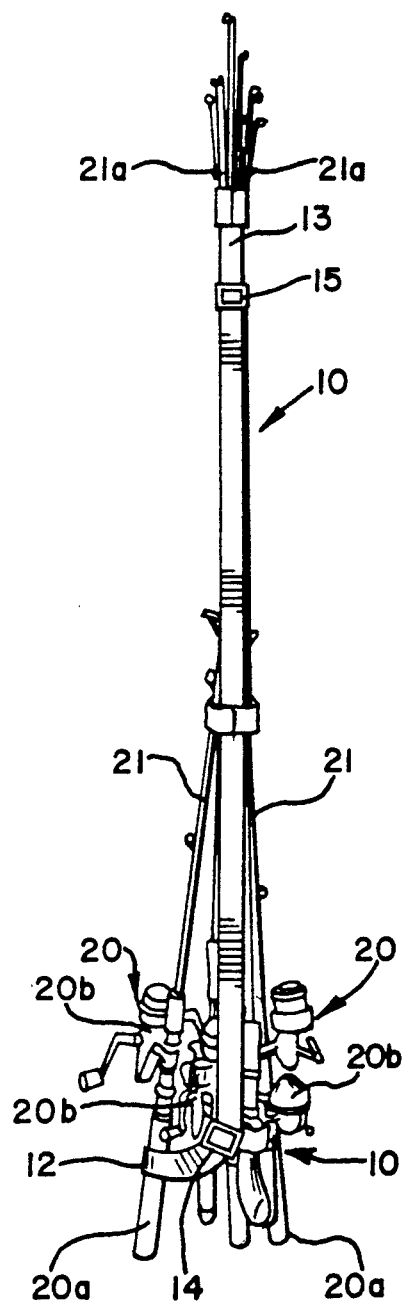
FIG. 2 is a front elevational view of the carrier of the invention shown in FIG. 1 as it appears when mounting a plurality of fishing rod and reel.

Referring to FIG. 2, the strap of the invention is shown in position mounted around a plurality of operable fishing rod and reel assemblies 20—20. In order to position the carrier 10 around the rod and reel assemblies 20—20, the bottom first loop 12 of strap 11 is made sufficiently large to fit same around the handles 20a—20a of rod and reel assemblies 20—20 underneath the reels 20b-20b thereof. The right angle mounting of one end of loop 12 adjacent buckle 14 assures that loop 12 will not flatten so that positioning rod handles through loop 12 is made easier. The loop 12 is thereafter made smaller to snugly fit around the rod handles 20a—20a. Thereafter, the strap 11 is positioned upwardly along the fishing rods 21—21, as shown most clearly in FIG. 3, and the upper second loop 13 is adjusted so that the top portion thereof having second strap 16 fitting therearound is positioned to extend around the rods from a point below the first inward eyelets 21a—21a of fishing rods 21, as shown most clearly in FIG. 2 Thereafter, the second strap 16 is wound around the fishing rod 21—21 subjacent the first interior eyelets 21a—21a thereof until the strap 16 wraps around itself and the hook and loop fasteners 16b-16c are securely, but selectively releaseably engaged against each other.

Next, the third strap 17 is adjusted along the length of the center portion of strap 11 to a desired position, as will be discussed in more detail below, and is then wrapped around the fishing rods 21—21 and around itself until the hooks 17b of one side of the strap are selectively releasably engaged along the loops 17c of the opposite side of the strap, as shown most clearly in FIG. 5. The engagement of strap 17 shown in FIG. 5 is also substantially identical to the engagement of strap 16 when it is positioned around the fishing rods 21 and around itself at a higher position on the fishing rods. It will be understood that the strap of the invention may also be used, if necessary, to carry a plurality of fishing rods without reels attached thereto, or any combination of fully and partly assembled rods or rods and reels.

The position of strap 17 along the length of fishing rods 21—21 may depend upon the size of the user, and upon the way the carrier is to be handled by a user. As shown most clearly in FIG. 1, when the carrier is mounted so as to act as a shoulder strap for carrying the plurality of fishing rod and reels 20-21, the portion of the strap 11 between strap 17 and buckle 14 is made longer to allow the user's shoulder to be positioned between the strap 11 and the fishing rods 21—21. When the carrier is adapted to be used as a hand carried assembly, as shown most clearly in FIG. 3, a portion of the main strap 11 between strap 17 and the bottom first loop 12 need not be as long as that shown in the shoulder strap carrying mode. Aside from the movement of third strap 17 up and down the fishing rods 21—21, the size of upper second loop 13 may also be varied to enlarge or decrease the size of the carrying strap 11 between the third strap 17 and the bottom first loop 12 of the carrier.

As shown most clearly in FIG. 2, it should also be noted that the carrier of the present invention provides an efficient means of storing a plurality of fishing rod and reel assemblies when they are not in use. Also, since the strap, which is preferably made of man-made material such as nylon, does not have any amount of sheet fabric connected with same, there is little likelihood that the carrier of the present invention will rot or deteriorate over time.

Thus, a new and improved means for hand carrying a plurality of assembled fishing rods and reels has been shown and described in accordance with the present invention. While one particular embodiment of the fishing rod and reel carrier has been shown and described, it will be obvious to those skilled in the art that additional changes may be made without departing from the invention in its broader aspects. Therefore, the aim in the appended claims is to cover all such changes and modifications as fall within the true spirit and scope of the invention.

The invention is claimed as follows:

1. A carrier for a fishing rod or an assembled fishing rod with handle and reel comprising:
   first elongate strap means,
   means at each of the opposing ends of said elongate strap means for providing first and second adjustable sized loops adjacent opposed ends of said first strap means,
   second elongate strap means including fastener means along the length thereof, said second strap means including a third loop adjacent tone end thereof for mounting around and slidably along said second loop, and
   third elongate strap means including fastener means along the length thereof, said third strap means including a fourth loop adjacent one end thereof for mounting around and slidably along said first elongate strap means, between said first and second adjustable sized loops.

2. The carrier as defined in claim 1 wherein said second elongate strap means includes hook fastener means along a first flat surface thereof and loop fastener means along a second opposing flat surface thereof for engagement with each other as said second strap means is wrapped around a plurality of fishing rods.

3. The carrier as defined in claim 1 wherein said third elongate strap means includes hook fastener means along a first flat surface thereof and loop fastener means along a second opposing flat surface thereof for engagement with each other as said third strap means is wrapped around a plurality of fishing rods.

4. The carrier as defined in claim 2 wherein said second elongate strap means extends substantially perpendicularly from said first strap means.

5. The carrier as defined in claim 3 wherein said third elongate strap means extends substantially perpendicularly from said first strap means.

6. A method for carrying a plurality of fishing rods including rod handles and reels with a carrier including a first strap having first and second opposed adjustable loops at the ends of said first strap, a second strap extending perpendicularly from said first strap from said second loop, and a third strap also extending perpendicularly from said first strap between said first and second loop, said method including the steps of:
   positioning the first adjustable loop around the outside of the handles of said plurality of fishing rods below the reels on said rods and tightening said first loop therearound,
   adjusting the size of said second loop until the end of said second loop is positioned below the first interior eyelets on said rods,
   wrapping one of said second and third straps around said fishing rods above said reels thereon and around itself until hook and loop fasteners thereon retain the strap around said fishing rods, and
   wrapping the other of said second and third straps around said fishing rods above said reels thereon and around itself until hook and loop fasteners thereon retain the strap around said fishing rods.

7. A carrier for a fishing rod or an assembled fishing rod with handle and reel comprising:
   first elongate strap means,
   buckle means at each of the opposing ends of said elongate strap means, said buckle means being adjustable for providing first and second adjustable sized loops adjacent opposed ends of said strap means,
   second elongate means including
   hook and loop fastener means along the length thereof, said second strap means including a third loop adjacent one end thereof for mounting around and slidably along said second loop, and
   third elongate strap means including hook and loop fastener means along the length thereof, said third strap means including a fourth loop adjacent one end thereof for mounting around and slidably along said first elongate strap means between said first and second adjustable sized loops.

* * * * *